United States Patent [19]

Schalge et al.

[11] 4,135,432
[45] Jan. 23, 1979

[54] ANCHOR FOR UNDERCUT BORE

[75] Inventors: Roger D. Schalge, Mahopec; Gus Neos, Astoria, both of N.Y.

[73] Assignee: Drillco Equipment Company, Inc., Long Island City, N.Y.

[21] Appl. No.: 853,797

[22] Filed: Nov. 21, 1977

[51] Int. Cl.$^2$ ............................................. F16B 13/04
[52] U.S. Cl. .......................................... 85/84; 52/711
[58] Field of Search ...................... 52/704, 711; 85/84, 85/79, 1 R

[56] References Cited

U.S. PATENT DOCUMENTS

| | | | |
|---|---|---|---|
| 519,172 | 5/1894 | Calkins | 85/84 |
| 2,438,533 | 3/1948 | Booth | 85/84 |
| 2,643,573 | 6/1953 | Johnson | 52/711 |
| 2,871,749 | 2/1959 | Kalb | 85/84 |
| 3,158,964 | 12/1964 | Haas | 52/704 |

FOREIGN PATENT DOCUMENTS 618489 2/1949 United Kingdom .................... 85/84

*Primary Examiner*—John E. Murtagh
*Attorney, Agent, or Firm*—Dowell & Dowell

[57] ABSTRACT

An anchor for insertion into a hole in a wall having an undercut groove extending therearound, the anchor having an elongated body with a bore therethrough, the bore being threaded at its outer end and tapering down in diameter toward the inner end of the body and slotted to permit expansion when a tapered pin is inserted therein. The body has an annular locking collar about its expandable portion placed to enter the groove when expanded. The groove and locking collar precisely interfit and are spaced from the inner end of the hole and the anchor body by a distance at least as great as the axial width of the collar. A screw member fits in the bore and has a pusher pin which pushes the expansion pin all the way into the bore when the member is screwed partway into the threaded bore portion, leaving part of the screw protruding from the body and the hole.

3 Claims, 5 Drawing Figures

ANCHOR FOR UNDERCUT BORE

FIELD OF INVENTION

This invention relates to expanding anchors to be secured in a preformed hole in a wall, such as concrete, to permit bolting to the wall, and more particularly relates to an anchor of the type which is expanded by a tapered member from inside the anchor body which body has an external annular locking collar that is expanded into an undercut groove spaced from the blind end of the preformed hole.

BACKGROUND AND PRIOR ART

It is often necessary or desirable to secure building members or machinery parts to a concrete wall after the wall is hardened, and in such cases it is customary to drill blind holes in the wall to receive anchor bolts or similar fastening means, of which many types are known in the prior art that are adequate for ordinary purposes.

In the building of nuclear power plants, however, the requirements have much closer tolerances, for example, as to pullout resistance, permissible longitudinal shifting in the hole when expanded, precautions to be taken to insure that the concrete will not be overstressed or cracked by expansion of the anchor, etc. To meet these requirements the present invention provides a type of anchor which has an annular collar which expands into a complimentary shaped undercut hole, the shape of the anchor being improved over prior art configurations.

The prior art shows several anchors which have radially expandable enlargements at their inner ends which are adapted to be set in an annular undercut located at the inner end of a blind hole, for instance as shown in Italian Patent No. 519,037 and in British Patent No. 618,489. In U.S. Pat. No. 2,707,897 to Beeson there is shown an anchor which is rotated in a hole to form its own undercut groove in the blind end thereof. Other patents showing holes preformed with undercuts at their inner ends include U.S. Pat. No. 519,172 to Calkins, U.S. Pat. No. 1,025,275 to Kennedy and U.S. Pat. No. 3,403,594 to Newell.

Examples of patents showing expandable anchors having annular shoulders which are expanded to dig into the walls of a hole and distort the walls by compressing the wall material are included in French Patent No. 2,307,166, and in the following U.S. prior art including U.S. Pat. No. 734,326 to Hicks, U.S. Pat. No. 1,179,472 to Tarleton, U.S. Pat. No. 2,561,433 to Uhle, U.S. Pat. No. 3,217,583 to Fulop, and U.S. Pat. No. 3,620,120 to Warner. Such compression of the wall material tends to cause overstressing in a concrete wall, and raises a risk of cracking the concrete which can not be permitted in a nuclear installation.

When an undercut blind hole is to be provided in a cured concrete wall, or the like, it is formed in two successive cutting operations. First, a cylindrical blind-end hole is drilled with a suitable masonry drill, for instance having carbide and/or diamond inserts, this hole being slightly larger in diameter than the body of the anchor to be set therein, and being at least as long as the portion of the anchor which is to occupy the hole. Second, an undercutting tool is inserted in the blind hole and is rotated therein to form an undercut groove at the desired axial position within the hole. Suitable undercutting tools are shown in the prior art, for instance in FIG. 8 of the aforementioned British Pat. No. 618,489, or in U.S. Pat. No. 2,365,549 to Haynes or U.S. Pat. No. 2,457,269 to Pfrehm.

In the case of each of the prior art anchors mentioned three paragraphs above as showing annular enlargements which are expandable into a previously undercut groove in the hole, the undercut groove and the enlargement were placed at the extreme inner end of the anchor and the hole. When an anchor having an annular locking collar has been expanded into locked position there are two shoulders to be considered in determining whether or not the anchor can be axially shifted in the hole, namely the forward facing shoulder of the collar which is an abutment resisting shifting of the anchor in the pull-out direction, and the rearward facing shoulder of the collar which is an abutment resisting shifting of the anchor further into the hole. The problem involved in successfully seating the anchor without leaving it axially shiftable results from the fact that two different tools are used to form the undercut shoulder abutments of the hole. It is a masonry drill which forms the blind end of the hole, but it is an undercut tool which forms the abutment for the forward facing shoulder. As a result, the separation between these inner and outer abutment shoulders as provided by the innermost wall of the hole and the undercut groove shoulder can be a variable, dependent in magnitude partly upon the skill of and partly upon the care taken by the workman in forming the hole.

THE INVENTION

The invention comprises an anchor having a body with an axial bore all the way through it. The body is long in comparison with its diameter and is threaded in the vicinity of the outer portion of the anchor body. The body is slotted from the outer threaded portion to its inner end to form an expandable portion over most of its length. The expandable portion tapers inwardly to a smaller diameter at its inner end, and has an annular locking collar around the body spaced from the inner end by a distance no less than the axial length of the collar itself. The diameter of the collar when the anchor is unexpanded is about equal to the outside diameter of the threaded portion of the body. The diameter of the axial bore through the body is equal to the diameter of the threaded bore where it meets it, but tapers down to a smaller diameter at a constant taper angle to the inner end of the body. A taper pin, having the same angle of taper, is insertable into the bore of the body, and when driven all the way thereinto, the taper pin expands the body to a substantially constant outer diameter along its full length, except at the collar which is then of larger diameter. A threaded member has an unthreaded pusher pin extending from its inner end, and is of such length that when the threaded member is fully screwed into the threaded portion of the body, the unthreaded pusher pin and the tapered pin are equal in combined length to the expandable portion of the body, the outer end of the threaded member extending from the body to receive a nut or other fastener means.

It is a principal object of the invention to provide an improved expansion anchor for insertion into and expansion within a blind hole having an undercut annular groove which is spaced back from the blind end of the hole, the groove having both its inner and its outer shoulders cut simultaneously by the same tool, and these shoulders having an accurately predetermined spacing axially of the hole. The expansion anchor has an expandable external locking collar whose shoulders are spaced with the same predetermined axial spacing, this collar fitting precisely into the undercut groove whose inner and outer shoulders comprise abutments for the shoulders of the annular collar and confine that collar snugly against axial shifting of the anchor when expanded.

Another object of the invention is to provide an anchor having an annular locking collar which is spaced back from the innermost end of the anchor body so that the anchor is locked against axial shifting in the drilled hole by the shoulders of the undercut groove, and not by the blind end of the hole which may be imperfectly formed, or may become partially crushed or damaged by the impact of the body of the anchor thereagainst while the anchor is being expanded by driving the taper pin thereinto. The drilled blind-end hole in the concrete may vary in depth or squareness at the inner end depending upon the care taken by the person drilling the hole or by the condition of the bit used to bore it. The undercut groove is formed by a tool whose bit is the same width as the axial length of the undercut groove, and this tool is supported with respect to the wall and the hole in such a way that it can not shift axially in the hole while it is undercutting the groove.

It is another object of the invention to provide an anchor whose body is long as compared with its diameter and which has a long expandable portion which is slotted for expansion along its entire length, said annular locking collar being located near the inner end of the slotted body portion but spaced back from the end. The annular collar is segmented by the slots, and its segments move outwardly into the undercut groove during expansion along arcuate paths whose centers are located approximately where the slots end and the threaded portion of the body begins. Thus, as the segments of the collar expand, the outwardly facing shoulders of the collar first move into the groove with a slight component of forward motion, and then the rearwardly facing shoulders of the segments move into the groove. However, that slight forward component of motion causes the rear shoulders to move cleanly into the groove without tending to abrade the rear abutment shoulders of the groove. This permits the shoulders of the segments to be fitted snugly into the groove without damaging it, whereby, once the anchor is expanded, its fit in the groove is very precise and precludes any tendency toward a loose fit that would allow the anchor to shift axially after it is set. This fact is important, since the anchor relies on a substantially perfect fit in the hole rather than on high pressure distortion of the concrete to hold it in place, thereby avoiding the possibility of damaging the concrete by excessive overstressing. French Patent No. 2,307,166, supra, is an example of the kind of stressing of the walls of the hole sought to be avoided.

Another object of the invention is to provide an anchor in which a portion of the slotted body extends inwardly beyond the annular locking collar, and this portion is used to space the collar the correct distance from the blind end of the hole to precisely match the position of the undercut groove in the hole. The groove in one embodiment is spaced from the blind end of the predrilled hole by bottoming a stop on the undercutting tool against the blind end. As a result, initial impact on the anchor during subsequent expansion of the anchor is delivered to the blind end of the hole and not to the shoulder of the undercut annular-locking groove, thereby tending to preserve the square cross-sectional shape of the groove.

A further object of the invention is to provide an anchor having an outer threaded portion of the body into which a threaded member is screwed after the anchor is set. The threaded member has a pusher pin at its inner end placed to further seat the tapered expansion pin, and the length of the threaded member is such that when the threaded member and the pusher pin and the tapered expansion pin are fully set against the blind end of the hole, a portion of the threaded member protrudes from the body of the anchor and extends out of the wall to support external bracket means or other structure to be attached to the wall, and receives a nut for completing such attachment.

Other objects and advantages of the invention will become apparent during the following discussion of the drawings:

THE DRAWINGS

Figure 1:
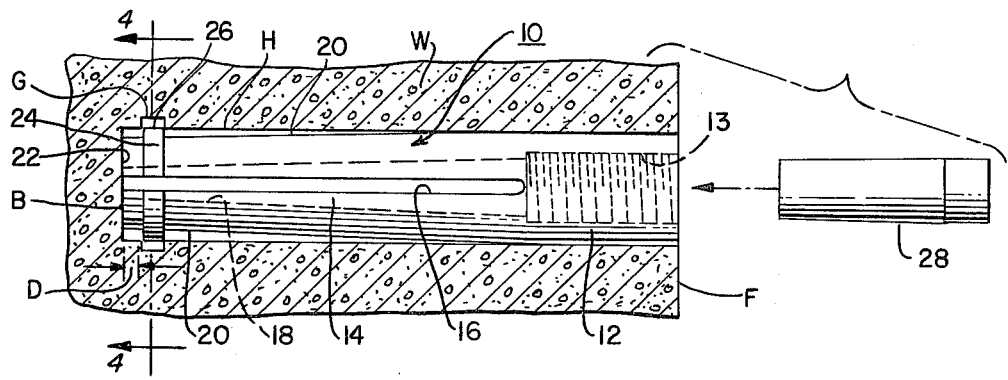
FIG. 1 is a cross-sectional view taken through a drilled and undercut hole in a concrete wall, and showing in elevation the body of an expansion anchor according to the present invention, with a tapered expansion pin about to be entered thereinto.
Figure 2:
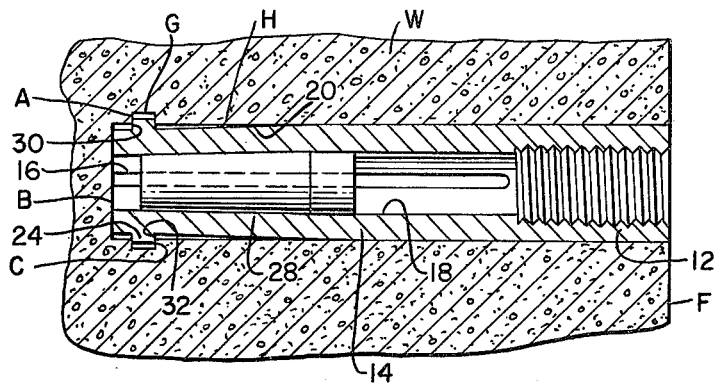
FIG. 2 is a view similar to FIG. 1, but showing the body of the anchor tool in cross-section, and showing the taper pin partly entered thereinto.
Figure 3:
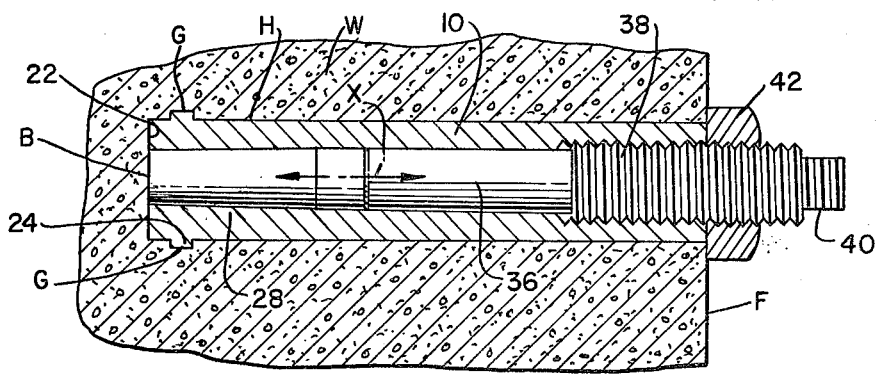
FIG. 3 is a view similar to FIG. 2, but showing the anchor tool fully expanded with the taper pin pushed into the inner end of the body by a threaded member screwed into the threaded outer bore portion of the body, and showing a nut screwed onto the threaded member.

Referring now to the drawings, FIGS. 1, 2, and 3 show a concrete wall W having an exposed face F and having a cylindrical hole H drilled into the wall with a blind inner end B. The inner end is preferably flat rather than conical so that the inner end can be used to position the anchor body when inserted therein and also to position the undercutting tool which is used to undercut a groove G which is located at a predetermined distance D from the blind end B of the hole H.

Figure 4:
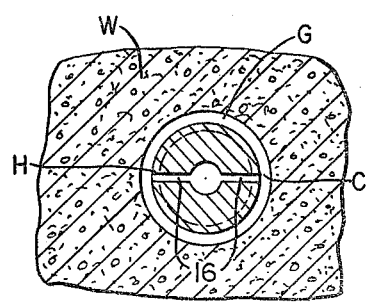
FIG. 4 is a cross-sectional view taken through line 4—4 of FIG. 1.

The anchor which is the subject of the present invention comprises an elongated body 10 having an outermost threaded portion 12 and having an innermost expandable portion 14 which is co-extensive with slots 16 which permit expansion of the expandable body portion. Although only two slots 16 are shown in FIG. 4, it is to be understood that in a practical anchor there will probably be either 3 or 4 such slots circumferentially spaced at even intervals around the expandable portion 14 of the anchor body in a manner which is well known in the prior art. The expandable portion of the body has a tapered bore 18 extending therethrough, and joining a threaded bore 13 of the threaded portion 12 of the anchor body 10. The angle of the tapered bore portion 18 is constant throughout its length in the relaxed position of the anchor body as shown in FIG. 1. The outer surface of the expandable portion of the anchor body is likewise tapered inwardly at a constant angle as shown at 20, and this taper continues all the way to the innermost end 22 of the anchor body which is square and abuts against the blind end B of the hole in the wall W.

The anchor has an annular locking collar 24 extending around its outer surface near, but spaced outwardly from the end wall 22 of the body 10. This spacing should be equal to the predetermined spacing D of the groove G from the blind end B of the hole. In the unexpanded condition shown in FIG. 1, the outer periphery 26 of the locking collar 24 is equal approximately to the outer diameter of the threaded portion 12 of the body 10, so that the anchor can be pushed into the hole H without resistance. The anchor should be a snug fit in the hole H, and therefore, its diameter is only very slightly less than the diameter of the hole H.

A tapered expansion pin 28 is then introduced into the tapered bore 18 and tapped inwardly in that bore in order to cause the expandable portion 14 of the anchor body to begin expansion in the manner shown in FIG. 2. In that figure, it will be seen that the locking collar 24 is now partially expanded into the groove G and that the space between the inner periphery of the hole H and the outer tapered surface 20 of the expandable portion of the body is diminished. The slots 16 have also partially expanded due to the presence of the tapered expansion pin 28 in the bore. As shown in FIG. 2, the inner shoulder 30 of the locking collar 24 now abuts the inner shoulder A of the undercut groove which serves as an abutment therefor. Also, the outer shoulder 32 of the locking collar 24 now abuts the outer shoulder C of the undercut groove G, the shoulders A and C serving as abutments for the shoulders 30 and 32.

Figure 5:
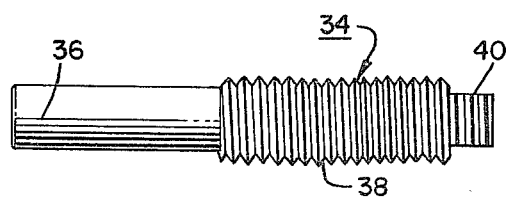
FIG. 5 is a view of the threaded member shown in elevation.

Once the tapered expansion pin 28 has moved pretty well into the bore 18, the threaded member 34 is then introduced into the bore of the anchor body 10. As shown in FIG. 5, the threaded member 34 has a pusher pin 36 at its inner end, and has a threaded portion 38 which engages the threads 13 of the threaded portion of the bore through the body. At its outer end, the threaded portion 38 has a set of flats 40 adapted to receive a wrench so that the threaded member 34 can be screwed inwardly of the bore 13 and 18 until the pusher pin 36 has pushed the tapered expansion pin 28 all the way into contact with the blind end B of the hole H. It will be noted that in this position some of the threaded portion 38 extends outwardly from the body 10 and from the face F of the wall so that it can receive a nut 42 designed to attach some external structural member, such as a bracket, to the wall in a manner well known per se.

In FIG. 3 the anchor is fully set, and the locking collar 24 is fully housed in the groove G. In this position, the shoulders A and C are snugly abutted with the shoulders 30 and 32, and the anchor is very accurately placed in the hole and is completely incapable of shifting along the axis X of the anchor bolt assembly.

FIG. 4 shows only two slots 16, which would divide the collar 24 into only two segments. These segments are annularly too extensive, and therefore, the body will be provided with either 3 or 4 slots 16 so as to make it easier to expand.

The anchor as presently manufactured is about seven and one-half inches long and about one half-inch in diameter, and the locking collar is located about a quarter of an inch back from the innermost end 22 of the anchor body and is about one quarter of an inch in axial length.

The present invention is not to be limited to the precise embodiment shown for illustrative purposes in the drawing, for obviously changes can be made therein within the scope of the following claims.

We claim:

1. An expandable anchor to be inserted in a cylindrical hole in a wall having a blind end and having an undercut annular groove at a predetermined axial location in the hole, the groove having inner and outer radially disposed shoulders having a predetermined axial spacing from said blind end, the anchor comprising:

an anchor body having a bore extending therethrough, the axial length of the anchor body being equal to the depth of the hole in the wall and the body having an outermost portion of diameter snugly fitting in said cylindrical hole and the bore being threaded inside of said outermost portion, and the anchor body having an innermost expandable portion joined to said outermost portion and tapering downwardly in diameter therefrom to the inner end of the body, the bore in the innermost portion tapering down from the diameter of said threaded portion to a smaller diameter at said inner end of the body;

an annular locking collar extending around the anchor body and having inner and outer shoulders mutually separated by said predetermined axial spacing and the spacing of the locking collar from the inner end of the expandable portion of the body being equal to the spacing of the annular groove from the blind end of the hole, the shoulders being radially disposed when the innermost portion of the body is expanded, and the collar being of diameter about equal to the diameter of the outermost portion of the anchor body when the innermost portion of the body is unexpanded, said innermost expandable portion of the body having multiple annularly spaced axially elongated slots extending from the junction of the outermost portion of the anchor body through the inner end of the body and dividing the innermost portion of the body and the collar into independently expandable segments;

a tapered expansion pin insertable into the bore and of diameter sufficient to expand the expandable segments outwardly to fit the hole and the undercut groove; and a threaded member having a threaded portion shaped to be screwed into the threaded portion of the bore and having a pusher pin shaped to extend into the expandable portion of the body and push the tapered expansion pin all the way to the inner end of the body.

2. The expandable anchor as set forth in claim 1, wherein the length of the tapered pin plus the length of said threaded member and pusher pin are greater than the axial length of the anchor body so that part of the threaded portion of the member extends from the anchor body.

3. The expandable anchor as set forth in claim 1, wherein the axial distance of the locking collar from the inner end of the anchor body is no less than the width of the locking collar as measured axially between its shoulders.

* * * * *